United States Patent [19]

Wetzel

[11] 4,350,086
[45] Sep. 21, 1982

[54] COOKING OF FOODSTUFFS

[76] Inventor: Clifford C. Wetzel, Rte. 2, Ithaca, Mich. 48847

[21] Appl. No.: 166,069

[22] Filed: Jul. 7, 1980

Related U.S. Application Data

[63] Continuation-in-part of Ser. No. 57,269, Jul. 13, 1979, abandoned.

[51] Int. Cl.³ .......................................... A47J 27/04
[52] U.S. Cl. ..................................... 99/368; 426/232
[58] Field of Search ................. 426/232, 523; 99/359, 99/368, 367, 369, 370, 448, 447, 443 R, 403

[56] References Cited

U.S. PATENT DOCUMENTS

| | | | |
|---|---|---|---|
| 3,494,305 | 2/1970 | Pachyn | 99/443 R X |
| 3,954,053 | 5/1976 | Johansson et al. | 99/443 R |
| 4,003,302 | 1/1977 | Mencacci | 99/359 |
| 4,085,668 | 4/1978 | Mughannam | 99/359 X |
| 4,132,216 | 1/1979 | Guibert | 99/359 |

FOREIGN PATENT DOCUMENTS

| 52206 | 9/1936 | Denmark | 99/359 |
|---|---|---|---|
| 332874 | 7/1930 | United Kingdom | 426/523 |

*Primary Examiner*—Billy J. Wilhite

*Attorney, Agent, or Firm*—Learman & McCulloch

[57] ABSTRACT

Packaged foodstuffs are cooked by introducing them into a pressure retort comprising a cylindrical vessel closed at one end and provided at its other end with a closure movable between open and closed positions. Within the vessel is a hollow housing having longitudinally extending walls defining therebetween a cooking chamber and forming passages between the housing and the vessel, the housing having at one end a transverse partition confronting end spaced from the closed end of the vessel to provide a compartment between the housing and the closed end of the vessel. The cooking chamber is adapted to accommodate foodstuffs carried by supports such as carts. Cooking is accomplished by introducing steam or hot water into the cooking chamber and maintaining therein an elevated temperature for the time necessary to cook the foodstuffs. Substantially uniform cooking temperature is maintained throughout the cooking chamber by discharging the steam or hot water from one end of the cooking chamber through an opening in the partition into the compartment, and then reintroducing such steam or hot water to the opposite end of the cooking chamber via passages. The circulation of the steam or hot water is effected by a rotary impeller mounted in the opening of the partition.

14 Claims, 7 Drawing Figures

COOKING OF FOODSTUFFS

RELATED APPLICATION

This application is a continuation-in-part of Ser. No. 57,269, filed July 13, 1979 now abandoned.

BACKGROUND OF THE INVENTION

It is possible to package raw or uncooked foodstuffs and subsequently cook such foodstuffs by placing the uncooked, packaged foodstuffs in a sealed vessel into which a heating medium, such as steam or hot water, is introduced to elevate the temperature within the vessel to one sufficient to cook the foodstuffs. One of the principal difficulties encountered heretofore in such processing of foodstuffs has been the obtaining of a substantially uniform temperature throughout the chamber in which the foodstuffs are located for the period of time required to ensure uniform cooking of the foodstuffs. Rigid control over the temperature during the cooking operation is essential so as to avoid both undercooking and overcooking of the foodstuffs.

The principal objective of the present invention is to provide an apparatus for cooking prepackaged foodstuffs at the proper temperature and for the proper time.

SUMMARY OF THE INVENTION

Cooking of foodstuffs according to the invention is accomplished by introducing carts having tiers of trays provided with packaged, uncooked foodstuffs into a pressure vessel and thereafter introducing a heating medium, such as steam or hot water, into the vessel, the medium being at such temperature as to effect cooking of the foodstuffs. The interior of the vessel is maintained under such pressure as to prevent explosion or rupture of the packages in which the foodstuffs are contained. Uniformity of the temperature throughout the vessel is achieved by establishing circulation of the heating medium from one end of the vessel to the other, and back again to the one end of the vessel. To ensure the maintenance of uniform temperature in that area of the vessel in which the cooking is accomplished, the flow of heating medium through the cooking area is in one direction only. This is accomplished by providing in the vessel a walled housing forming a cooking chamber, the chamber terminating at one end in a partition having an opening therein occupied by an impeller. The walls of the housing and the walls of the vessel form passages extending the length of the cooking chamber. Heating medium withdrawn from the cooking chamber by the impeller is introduced to the passages and flows alongside the housing to the opposite end of the latter and is reintroduced to the cooking chamber for further circulation.

Means is provided for cooling the foodstuffs following their being cooked and means also is provided for maintaining sufficient pressure within the vessel during cooling of the foodstuffs to prevent rupture of the packages in which the foodstuffs are contained.

DESCRIPTION OF THE DRAWINGS

Various advantages and characteristics of apparatus according to the invention are disclosed in the following description and in the accompanying drawings, wherein.

DETAILED DESCRIPTION OF THE INVENTION

Figure 1:
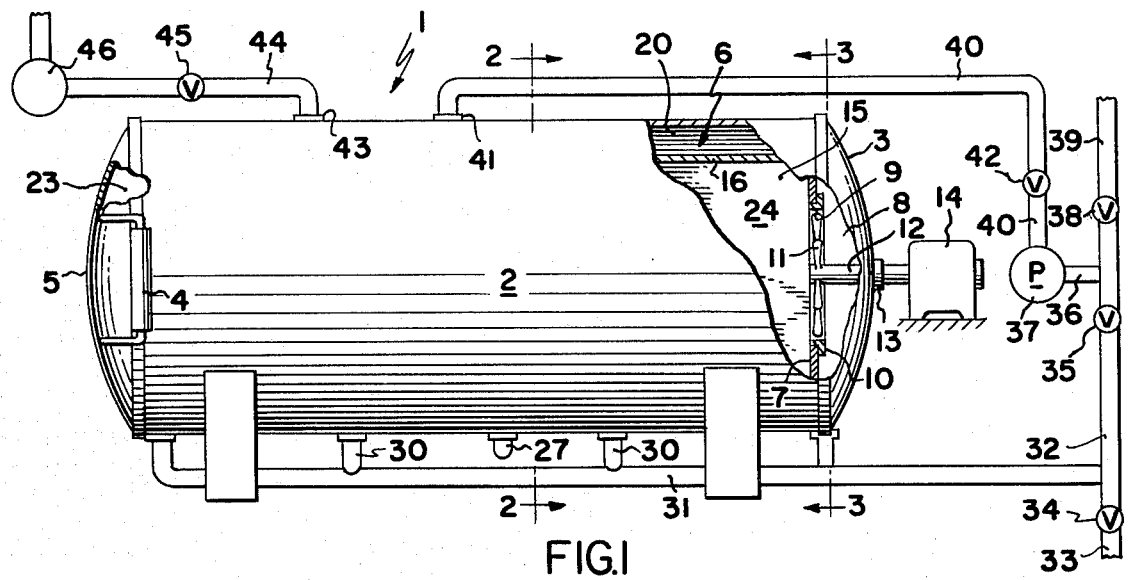
FIG. 1 is a side elevational view, partly broken away, of apparatus constructed according to the invention.
Figure 2:
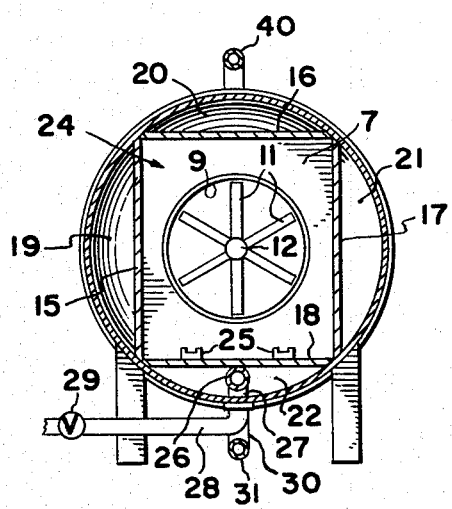
FIG. 2 is a sectional view taken on the line 2—2 of FIG. 1.
Figure 3:
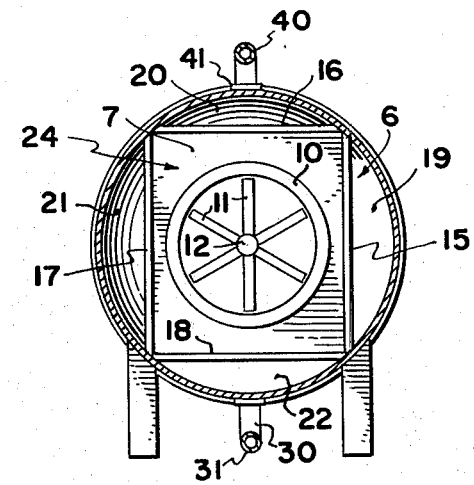
FIG. 3 is a sectional view taken on the line 3—3 of FIG. 1.
Figure 7:
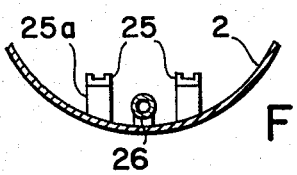
FIG. 7 is a fragmentary, sectional view similar to FIG. 2, but illustrating a modification.

Apparatus constructed in accordance with the preferred embodiment of the invention comprises a pressure retort or vessel 1 having a cylindrical wall 2 closed at one end by an outwardly convex bell wall 3 and being open at its opposite end. At the open end of the retort is a hinge 4 by means of which an outwardly convex closure 5 may be swung between open and closed positions. Latch members (not shown) are provided on the wall 2 and the closure 5 for the purpose of releasably latching the closure 5 in its closed position so as to seal the interior of the retort when desired. The members 2, 3, and 5 are provided with external insulation which is not shown in the drawings for the sake of clarity.

Within the vessel is a preferably four-sided, hollow housing 6 open at that end confronting the vessel closure 5 and having a transverse wall 7 at its opposite end. The wall 7 is spaced from the vessel wall 3 to form a compartment 8 therebetween. The wall 7 has a central opening 9 therein within which is fitted a collar 10. Accommodated in the opening 9 is a multi-bladed impeller 11 fixed at one end of a shaft 12 that extends through a stuffing box 13 mounted in the wall 3 and has its other end coupled to the armature shaft of an electrical motor 14.

The housing preferably has four walls 15, 16 17, and 18 extending longitudinally from the wall 7 toward the open end of the retort 1. Each of the four walls is welded along its full length to the interior surface of fhe cylindrical wall 2. The housing walls form passages 19, 20, 21, and 22 which communicate at one end with the compartment 8 and at the other end with a compartment 23 formed by the closure 5 when the latter is in its closed position.

The arrangement is such that the wall 7 and the walls 15–18 form an elongate cooking chamber 24, square in cross-section, and flanked by the passages 19–22.

Extending along the bottom wall 18 of the housing is a pair of spaced rails 25. Also extending within and longitudinally of the retort, beneath the wall 18, is a perforated steam pipe 26. The pipe 26 is joined to a fitting 27 which extends through the retort wall 2 and is coupled to one end of an inlet pipe 28, the opposite end of which is connected to a source (not shown) of steam via a valve 29.

At intervals along the lower part of the retort wall 2 are water drain openings that are connected by fittings 30 to a manifold 31. The manifold 31 is joined to a pipe 32 having a branch 33 leading to a drain (not shown) via a valve 34. The pipe 32 also is coupled, via a valve 35, to the intake 36 of a water pump 37. The inlet 36 also is coupled, through a valve 38, to a pipe 39 which leads to a source (not shown) of water.

From the pump 37 extends a water conduit 40 which overlies the wall 2 and communicates via a fitting 41 with the interior of the retort through a valve 42. Water discharged from the conduit 40 flows across the wall 16 into the chambers 8 and 18 and thence into the cooking chamber 24 and the passages 19-22. If hot water is to be used as the heating medium, the wall 16 may be perforated to permit water to pass through the wall 16 directly into the cooking chamber.

Also overlying the cylindrical wall 2 of the vessel and communicating with the interior of the retort through a fitting 43 is a gas pipe 44 which communicates via a valve 45 with a compressor 46. Compressed gas (air) thus may be delivered to the interior of the retort and enter the cooking chamber 24 under the control of the valve 45.

Figure 4:
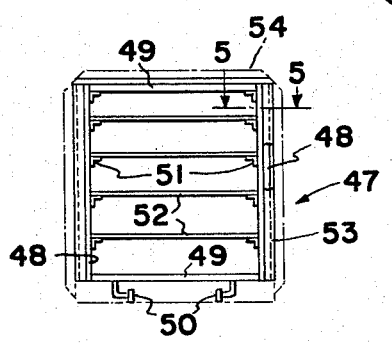
FIG. 4 is an end elevlational view of a cart having trays for the accommodation of foodstuffs.

Adapted for use with the retort 1 is a plurality of carts, one of which is shown at 47 in FIG. 4. Each cart comprises an open, rectangular frame having vertical and horizontal frame members 48 and 49, respectively. Wheels 50 are mounted on the lower, horizontal frame members 49, the spacing between the wheels 50 corresponding to that between the rails 25 so as to enable the cart to be guided into and out of the retort through the open end of the latter. The vertical frame members 48 are provided with lugs 51 on which tiers of trays 52 removably may be supported. Each tray is perforated and is adapted to support packages of food (not shown).

Figure 5:
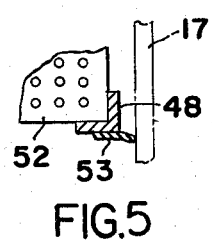
FIG. 5 is a sectional view, on an enlarged scale, and taken on the line 5—5 of FIG. 4.
Figure 6:
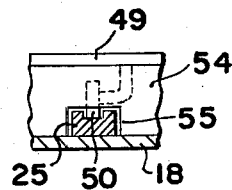
FIG. 6 is a fragmentary, partly elevational and partly sectional view of the lower end of one of the carts.

The width of each cart 47 is somewhat less than the spacing between the side walls 15 and 17 and the height of each cart is somewhat less than the distance between the wall 16 and the rails 25 so as to enable free passage of the cart into and out of the retort. It is preferred, however, that each vertical frame member 48 have secured thereto a sealing strip of flexible belting 53 which spans the gap between the cart and such walls, as is shown in FIG. 5. The upper and lower frame members 49 of each cart also preferably include similar belting 54 which spans the gaps between the cart and the walls 16 and 18, the lower belting being notched as at 55 to accommodate the rails 25.

When the apparatus is conditioned for operation, as a steam cooker, the contents of the retort will be drained and the closure 5 opened. A plurality of carts 47 provided with trays 52 supporting packaged, uncooked foodstuffs are wheeled into the retort and the closure 5 closed and sealed. If desired, the valves 38 and 42 may be opened and the pump 37 operated to fill the retort completely with water. When the retort is full of water, the valves 38 and 42 are closed, the valve 29 is opened to enable steam to be delivered into the retort, and the valve 34 opened so that, as the retort fills with steam, the water will be displaced. This procedure is preferred in some instances because displacement of water by steam avoids the introduction of air into the retort, thereby accelerating the cooking of the foodstuffs.

If the water in the vessel is drained to a level at which the surface of the water corresponds substantially to the level of the lower frame members 49 of the carts, the water will form a hydraulic seal at the bottom of the vessel, thereby enabling elimination of the wall 18 and the lower belting 54, in which event the rails 25 may be supported by legs 25a fixed to the inner surface of the wall 2. See Figure. This water level may be maintained by means of the valve 42.

Following the introduction of steam to the retort the motor 14 is started to drive the impeller 11. In operations using steam, the impeller may be a fan. Operation of the impeller will cause steam to be withdrawn from one end of the cooking chamber 24 through the opening 9 in the wall 7, into the compartment 8, and thence into the passages 19, 20, and 21, as well as into the passage 22 if the wall 18 is used and the water level is below that of the wall 18. From the passages the steam passes into the chamber 23 and then re-enters the cooking chamber 24. The presence of the seals 53, 54 or the hydraulic seal, if used in lieu of the lower belting 54, ensures that most of the steam passing through the cooking chamber passes between the trays 52 so as to pass over, under, and around the packages on the trays 52. The continuous circulation of the steam establishes and maintains a virtually uniform temperature and pressure throughout the interior of the retort.

The temperature and pressure of the steam and the length of cooking time depend on the foodstuffs to be cooked, the manner in which the foodstuffs are packaged, and the temperature of the foodstuffs at the time they are placed in the retort. Generally, a temperature of between 240° F. and 250° F. is adequate to cook most foodstuffs, and maintenance of pressure within the retort of between 15 and 20 psi is sufficient to prevent rupture of the packages. However, the apparatus is capable of maintaining temperatures and pressures other than those mentioned.

When the prescribed cooking time has elapsed, the steam may be shut off, by means of the valve 29, the valves 38 and 42 opened, and the pump 37 started to introduce cooling water into the retort via the pipe 40. During the introduction of cooling water to the retort, the valve 45 is opened and compressed air is introduced to the retort via the pipe 44 so as to maintain sufficient pressure within the retort to prevent rupture of the foodstuff packages. After a sufficient quantity of water has been introduced to the retort, the valve 38 may be closed and the valve 35 opened, whereupon the water may be circulated by the pump 37 for a period of time sufficient to cool the cooked foodstuffs and reduce the pressure within the retort to a level sufficient to enable the closure 5 to be opened and the trays removed. The entire process then may be repeated.

In one practical embodiment of the invention in which steam was used as the cooling medium, the retort had a diameter of four feet and a length of twenty-four feet. The walls 15-18 formed a cooking chamber square in cross-section and in which were accommodated ten carts each of which contained sixteen trays for the support of packaged foodstuffs. About three minutes' time was required to establish a temperature of 246° F. in the cooking chamber. The fan had a capacity of 5000 cfm at six inches static pressure. Cooking time was one hour. The maximum temperature variation at any point within the cooking chamber during the entire cooking period was 0.4° F., well within the permissible variation of 2° F. established by the United States Food and Drug Administration.

When hot water is used as the cooking medium, the blades of the fan are replaced by propeller blades which effect circulation of the water in the same manner that the fan blades circulate the steam. The water temperature is controlled by the admission to the retort of steam via the steam pipe 26 and conventional controls. The pressure within the retort is controlled by the introduction of compressed gas via the pipe 44. The results obtained using hot water were virtually the same as those obtained using steam, except that a little longer time was required to establish the cooking temperature within the cooking chamber.

This disclosure is intended to be illustrative rather than definitive of the invention. The invention is defined in the claims.

I claim:

1. A pressure retort construction comprising a hollow vessel closed at one end and open at its other end; closure means at said other end for selectively opening and closing the latter; a walled, hollow housing accommodated in said vessel, said housing having its walls spaced from said vessel to form passages between said housing and said vessel, said housing being open at one end and having an end wall at its opposite end, said end wall having an opening therein; means for introducing a fluid heating medium into said vessel; circulating means occupying the opening in said housing end wall; means for driving said circulating means in a direction to circulate said heating medium from one end of said vessel to the other end through said housing and from said other end of said vessel to its said one end through said passages; foodstuff supporting means removably accommodated in said housing and being open in directions fore and aft of said housing; and means for effecting a seal between said supporting means and at least two walls of said housing.

2. The construction according to claim 1 including means for effecting a seal between said supporting means and all walls of said housing except its end walls.

3. The construction according to claim 1 wherein the means for effecting a seal comprises flexible material.

4. The construction according to claim 1 wherein the means for effecting a seal comprises a liquid.

5. The construction according to claim 1 wherein said housing has a top wall, a bottom wall, and two side walls, the means for effecting a seal extending between said supporting means and said two side walls.

6. The construction according to claim 5 wherein the means for effecting a seal also extends between said supporting means and said top wall.

7. The construction according to claim 5 wherein the means for effecting a seal also extends between said supporting means and said bottom wall.

8. The construction according to claim 1 wherein said housing has a top wall and two side walls, the means for effecting a seal extending between said supporting means and said side walls.

9. The construction according to claim 8 wherein the means for effecting a seal also extends between said supporting means and said top wall.

10. The construction according to claim 8 wherein said top wall is imperforate.

11. The construction according to claim 1 including means for introducing gas under pressure into said vessel.

12. The construction according to claim 1 including means for introducing liquid into said vessel.

13. The construction according to claim 1 wherein said heating medium is steam.

14. The construction according to claim 1 wherein said heating medium is hot liquid.

* * * * *